United States Patent
Ishizawa et al.

(10) Patent No.: US 7,641,403 B2
(45) Date of Patent: Jan. 5, 2010

(54) CAMERA MODULE

(75) Inventors: Takashi Ishizawa, Yamagata (JP); Tomohiko Osaka, Yamagata (JP)

(73) Assignee: Mitsumi Electric Co., Ltd. (JP)

( * ) Notice: Subject to any disclaimer, the term of this patent is extended or adjusted under 35 U.S.C. 154(b) by 203 days.

(21) Appl. No.: 11/853,629

(22) Filed: Sep. 11, 2007

(65) Prior Publication Data

US 2008/0069557 A1 Mar. 20, 2008

(30) Foreign Application Priority Data

Sep. 14, 2006 (JP) ............................. 2006-249708

(51) Int. Cl.
G03B 17/00 (2006.01)
(52) U.S. Cl. ...................................... 396/529; 396/542
(58) Field of Classification Search ................. 396/529, 396/542
See application file for complete search history.

(56) References Cited

U.S. PATENT DOCUMENTS 7,492,538 B2 * 2/2009 Ishizawa et al. ............. 359/824

2006/0028320 A1 2/2006 Osaka
2006/0203627 A1 9/2006 Osaka

FOREIGN PATENT DOCUMENTS

| JP | 2003295033 A | 10/2003 |
|----|--------------|---------|
| JP | 2004280031 A | 10/2004 |
| JP | 2005128392 A | 5/2005 |
| JP | 2006017924 A | 1/2006 |
| JP | 2006293244 A | 10/2006 |

* cited by examiner

Primary Examiner—Rodney E Fuller
(74) Attorney, Agent, or Firm—Marger Johnson & McCollom, P.C.

(57) ABSTRACT

A camera module includes a holder provided with a lens unit and displaceable along an optical axis; a coil formed from a wound wire having lead wires; a yoke and magnets for providing a magnetic field to the coil; a flexible printed circuit board for supplying an electrical current to the lead wires; and upper and lower leaf springs for supporting the holder displaceably along the optical axis. Each of the upper and lower springs includes an outer annular portion and an inner annular portion, and coupled by bridge portions. Part of the flexible printed circuit board is formed into a tongue part arranged in a space between a bridge portion of the lower leaf spring and the lead wires to prevent contact with the lead wires.

3 Claims, 4 Drawing Sheets

CAMERA MODULE

BACKGROUND OF THE INVENTION

1. Field of the Invention

This invention relates to a camera module, and more specifically to a camera module that can be used in small-sized electronic apparatuses such as digital cameras, camera-equipped cellular phones and the like.

2. Description of the Related Art

A camera module having a function of displacing a lens unit in a direction of an optical axis of the lens unit is used in relatively small-sized digital cameras, camera-equipped cellular phones and the like. This function is used for providing an autofocus function and/or zoom function and the like, and is achieved by an interaction between a magnetic field generated by an electrical current flowing in a coil and a magnetic field generated by a yoke and magnets provided on the yoke.

Such a camera module includes a barrel which holds the lens unit, a holder which houses the barrel therein, and a pair of leaf springs for supporting the holder so that the holder is displaceable in a direction of an optical axis of the lens unit. Further, the camera module also includes lead wires (that is, both end portions of a wire of the coil) for supplying an electrical current to the coil provided around the holder which is displaceable in the optical axis direction.

FIG. 3 is an exploded perspective view of an autofocus actuator assembly 100 used in a conventional camera module for displacing a lens unit (not shown) in a direction of an optical axis thereof. It is to be noted that an imaging element (not shown) is provided below a base 111 of the actuator assembly 100.

A holder 108 that houses a barrel (not shown) holding the lens unit is provided in a space between a cover 101 and the base 111 so that the holder 108 is displaceable in a direction of an optical axis of the lens unit together with the lens unit.

A ring-shaped inner annular portion 104b of an upper leaf spring 104 and a ring-shaped inner annular portion 110b of a lower leaf spring 110 are attached to the upper and lower cylindrical end portions of the holder 108, respectively, using an adhesive. Further, an outer annular portion 104a of the upper leaf spring 104 is attached to a top surface of a yoke 105 and an outer annular portion 110a of the lower leaf spring 110 is provided on a lower end of the yoke 105, respectively. Furthermore, on the upper surface of the inner annular portion 104b of the upper spring 104 which is attached to the upper cylindrical end portion of the holder 108, a stopper denoted by the reference numeral 102 is attached using an adhesive.

Three bridge portions 104c are coupled between the outer annular portion 104a and the inner annular portion 104b of the upper leaf spring 104. As is the same with the upper leaf spring 104, three bridge portions 110c are coupled between the outer annular portion 110a and the inner annular portion 110b of the upper leaf spring 110. By resilient deformation of the respective three bridge portions 104c and 110c, the holder 108 can be displaced in a direction of an optical axis of the lens unit.

A plurality of magnets 106 are provided on the yoke 105 so as to produce a magnetic field. The yoke 105 has an axial bore 105a for receiving the holder 108. Further, a coil 107 is provided around an outer periphery of the holder 108 so that the coil 7 is disposed in the magnetic field produced by the magnets and the yoke 105 in a state that the holder 108 is received in the axial bore 105a. By supplying a current to the coil 107 to generate a magnetic field, the holder 108 can be displaced in a direction of an optical axis of the lens unit by a driving force generated by the interaction of the magnetic fields. In this regard, it is to be noted that a component donated by the reference numeral 109 is a ring-shaped plate provided between the lower leaf spring 110 and the lower end of the yoke 105.

A flexible printed circuit board 103 for supplying an electrical current to the coil 107 is provided below the outer annular portion 110a of the lower leaf spring 110, and two lead wires (that is, both end portions of a wire of the coil) 103a, 103b are extended from the coil 107 through notches 110d, 110d formed on the inner periphery of the inner annular portion 110b of the lower leaf spring 110 (see FIG. 4). Tip ends of the lead wires 103a, 103b are connected to pads 103c, 103d of the flexible printed circuit board 103, respectively. In more details, these lead wires 103a, 103b are arranged below the bridge portions 110c so as to extend through a predetermined space below the bottom surfaces of the bridge portions 110c. As described above, the outer annular portion 110a of the lower spring 110 is attached to the yoke 105 through the plate 109, and the yoke 105 is electrically connected to a cover of a substrate (not shown) on which the camera module is to be mounted to thereby provide a ground therebetween.

It is to be noted that an actuator assembly similar to the actuator assembly 100 described above is disclosed in JP-A-No. 2004-280031.

As described above, the lead wires 103a, 103b are arranged below the bridge portions 110c so as to extend through a predetermined space below the bottom surfaces of the bridge portions 110c. In the camera module having the above structure, in the event that the electronic apparatus equipped with the camera module is dropped by accident and thus the holder 108 is abruptly displaced due to the shock, there is a case that the bridge portion 110c is largely deformed toward the corresponding lead wire to make severely contact with the lead wire to thereby damage an insulation coating of the lead wire. If such a damage of the insulation coating of the lead wire occurs and thereby the bridge portion 110c makes direct contact with a conductor of the lead wire, momentary shunt is caused between the lead wire and the ground through the lower leaf spring 110 and the yoke 105.

In the conventional camera module described above, in order to prevent such undesirable damage of the lead wire, regions of the bottom surfaces of the bridge portions 110c which correspond to the lead wires 103a, 103b are coated with an insulating resin such as silicone resin so that the insulation coating is not damaged by the deformed bridge portion 110c even in the case where the bridge portion makes severely contact with the lead wire.

In the method mentioned above, it is necessary to carry out an application of the silicone resin or the like onto the bottom surfaces of the bridge portions 110c in the manufacturing process of the camera module. However, since the width of each bridge portion is extremely narrow, the application of the resin must be carried out carefully. Therefore, there is a problem in that it takes a relatively long time in manufacturing the camera module. Further, a cost of the synthetic resin must be included in a manufacturing cost of the camera module, thus leading to an increased manufacturing cost of the camera module.

SUMMARY OF THE INVENTION

The present invention has been made in view of the problem described above, and therefore it is an object of the present invention to provide a camera module which can be manufactured easily and in which a damage to a lead wire by a deformed bridge portion of a leaf spring can be prevented.

In order to achieve the object, the present invention is directed to a camera module, which comprises: a lens unit which constitutes an optical system of the camera module; a holder which houses the lens unit and is displaceable along an optical axis direction of the lens unit, the holder having a cylindrical shape having upper and lower cylindrical end portions; a coil provided on the holder, the coil being formed from a wound wire having both end portions used as lead wires for supplying an electrical current to the coil; a yoke and magnets provided on the yoke for providing a magnetic field to the coil; a flexible printed circuit board to which the lead wires are connected for supplying an electrical current to the lead wires, the flexible printed circuit board having an insulating sheet portion and a pattern portion; upper and lower leaf springs for supporting the holder so that the holder is displaceable along an optical axis direction of the lens unit, each of the upper and lower springs including an outer annular portion, an inner annular portion provided inside the outer annular portion and attached to one of the cylindrical end portions of the holder, and a plurality of bridge portions coupled between the outer annular portion and the inner annular portion for displaceably supporting the inner annular portion with respect to the outer annular portion; and an imaging element provided below the lens unit. In the camera module described above, a part of the insulating sheet portion of the flexible printed circuit board is formed into a tongue part which extends in a tongue-shaped manner. The tongue part is arranged in a space between one of the bridge portions of the upper or lower leaf spring and the lead wires so that the bridge portion does not make contact with the lead wires even in the event that the bridge portion is hardly deformed.

According to the camera module of the present invention having the above structure, even in the event that the holder is largely displaced and thus the bridge portion is deformed due to shock applied to the camera module, since the tongue part is arranged below the bridge portion, it is possible to prevent the deformed bridge portion from making direct contact with the lead wires. Therefore, it is possible to prevent the insulating coating of the lead wires from being damaged by the deformed bridge portion. Further, a process for applying a synthetic resin onto the bottom surfaces of the bridge portions of the lower leaf spring can be omitted, a time required for manufacturing the camera module can be shortened.

In the camera module of the present invention, it is preferred that the flexible printed circuit board is arranged below the lower leaf spring so that the tongue part extends substantially along with a predetermined bridge portion of the lower leaf spring.

Further, in the camera module of the present invention, it is preferred that the tongue part is formed so as to cover almost of the lead wires.

The above and other objects, features and advantages of the present invention will be apparent from the following description when taken in conjunction with the accompanying drawings which illustrate preferred embodiments of the present invention by way of example.

DETAILED DESCRIPTION OF THE PREFERRED EMBODIMENTS

Figure 1:
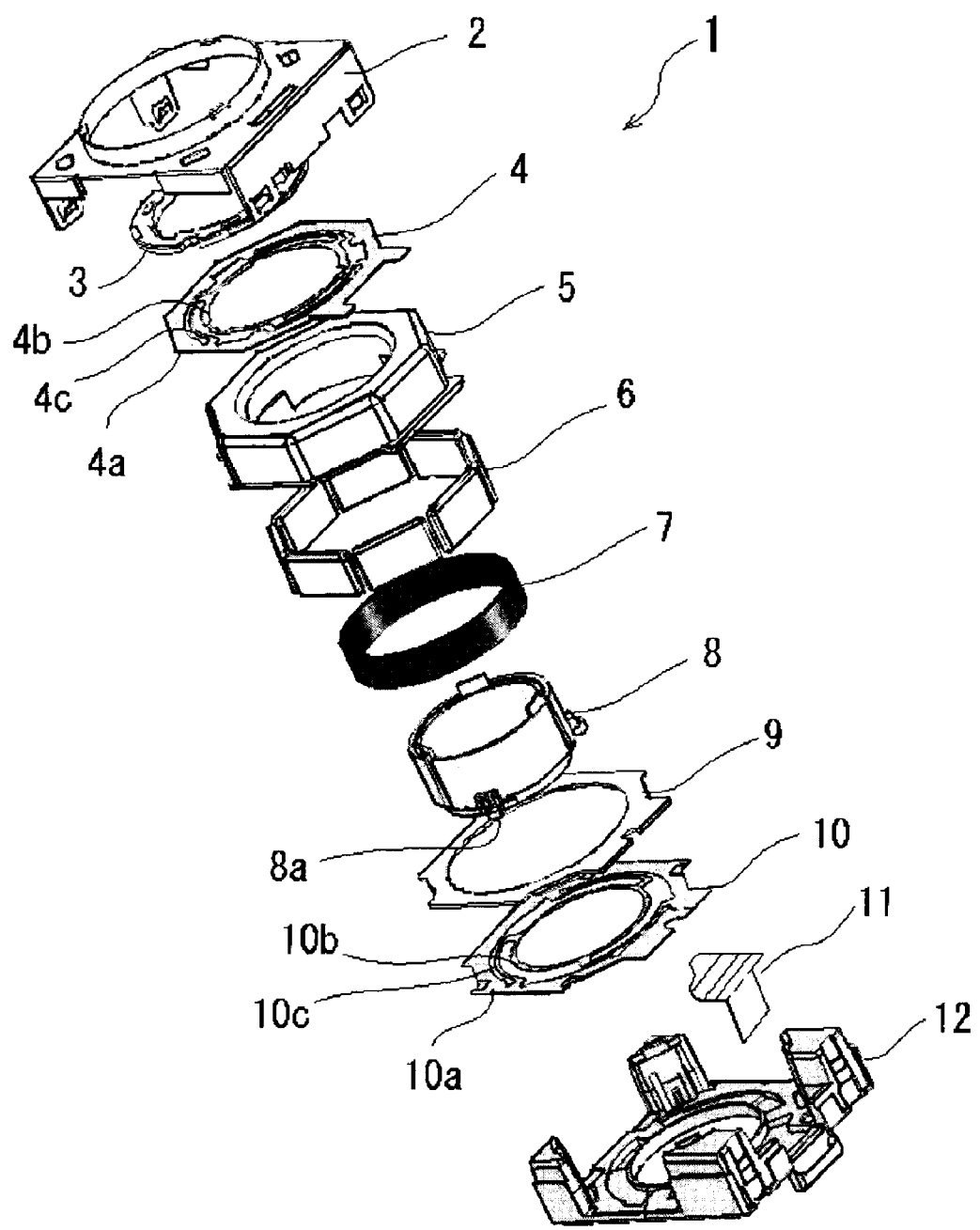
FIG. 1 is an exploded perspective view of an actuator assembly 1 of a camera module of an embodiment according to the present invention.

A camera module according to an embodiment of the present invention will be described below with reference to the accompanying drawing.

The camera module according to the embodiment comprises: a lens unit (not shown) which constitutes an optical system of the camera module; a holder 8 which houses the lens unit and is displaceable along an optical axis direction of the lens unit and has a cylindrical shape having upper and lower cylindrical end portions; a coil 7 provided on the holder 8, the coil 7 being formed from a wound wire having an insulating coating, and the wire having both end portions used as lead wires 11a, 11b for supplying an electrical current to the coil 7; a yoke 5 and magnets 6 provided on the yoke 5 for providing a magnetic field to the coil 7; a flexible printed circuit board 11 for supplying an electrical current to the lead wires 11a, 11b, the flexible printed circuit board 11 having an insulating sheet portion and a pattern portion; upper and lower leaf springs 4, 10 for supporting the holder 8 so that the holder 8 is displaceable along an optical axis direction of the lens unit; and an imaging element provided below the lens unit. Each of the upper and lower springs 4, 10 including an outer annular portion 4a (10a), an inner annular portion 4b (10b) provided inside the outer annular portion 4a (10a) and attached to the cylindrical end portions of the holder 8, and a plurality of bridge portions 4c (10c) coupled between the outer annular portion 4a (10a) and the inner annular portion 4b (10b) for displaceably supporting the inner annular portion 4b (10b) with respect to the outer annular portion 4a (10a). The camera module of this embodiment is characterized in that a part of the insulating sheet portion of the flexible printed circuit board 11 is formed into a tongue part 11c which extends in a tongue-shaped manner, wherein the tongue part 11c is arranged in a space between one of the bridge portions 10c of the lower leaf spring 10 and the lead wires 11a, 11b so that the bridge portion 10c does not make contact with the lead wires 11a, 11b even in the event that the bridge portion 10c is largely deformed.

Hereinbelow, with reference to FIG. 1, description is made with regard to an actuator assembly 1 of the camera module of the embodiment according to the present invention. In this regard, it is to be noted that an imaging element (not shown in the drawing) is disposed below a base 12.

The holder 8 is a cylindrical member made of a synthetic resin and having three coil support portions 8c at three locations of an outer circumferential surface thereof for supporting the coil 7. On the base part of one of the three coil support portions 8c, an aperture 8b described later is formed. Further, on the bottom surface of each of the coil support portions 8c, there is formed a boss 8b. These bosses 8b extend through a space between the outer annular portion 10a and the inner annular portion 10b of the lower leaf spring 10, and abut on the base 12 for applying a predetermined back tension to the upper and lower leaf springs 4 and 10. As described above, the inner annular portion 4b of the upper leaf spring 4 is attached the upper cylindrical end portion of the holder 8 and the inner annular portion 10b of the lower leaf spring 10 is attached to the lower cylindrical end portion of the holder 8, respectively. Further, the outer annular portion 4a of the upper leaf spring 4 is attached to a top surface of the yoke 5 provided on the base 12 and the outer annular portion 10a of the lower leaf spring 10 is attached to a lower end portion of the yoke 5 through an annular plate 19 (which will be described below in more detail). Furthermore, on the upper surface of the inner annular portion 4b of the upper spring 4 which is attached to the upper cylindrical end portion of the holder 8, a stopper 3 is attached using an adhesive. This stopper 3 is provided for restricting upwardly excessive displacement of the holder 8 by the abutment with the bottom surface of the cover 2 when the holder 8 is largely displaced.

Each of the upper and lower leaf springs 4, 10 is formed from a thin metal plate made of beryllium copper through a punching process, and has the ring-shaped outer annular portion 4a, 10a and the ring-shaped inner annular portion 4b, 10b which is concentrically provided inside the outer annular portion 4a, 10a through an annular spacing. The inner annular portion 4b, 10b is displaceably supported by the outer annular portion 4a, 10a through the bridge portions 4c, 10c. Each of the bridge portions 4c, 10c has an elongated arc-shape which extends along the inner periphery of the outer annular portion 4a, 10a and the outer periphery of the inner annular portion 4b, 10b through a predetermined angle. By resilient deformation of the respective three bridge portions 4c and 10c, the holder 8 can be displaced in a direction of an optical axis of the lens unit.

The plurality of magnets 6 are bonded to the inner surface of the yoke 5 so as to produce a magnetic field. Further, the coil 7 is provided around an outer periphery of the holder 8 so that the coil 7 is disposed in the magnetic field generated by the magnets 6 and the yoke 5. The yoke 7 has an axial bore 8a for receiving the holder 8. The holder 8 can be displaced through the axial bore 8a in a direction of an optical axis of the lens unit by supplying an electrical current to the coil 7. Further, the annular plate 9 made of a magnetic metal material is provided between the lower leaf spring 10 and the bottom surface of the yoke 5 for reducing leakage of magnetic fluxes from the magnets 6.

Figure 2:
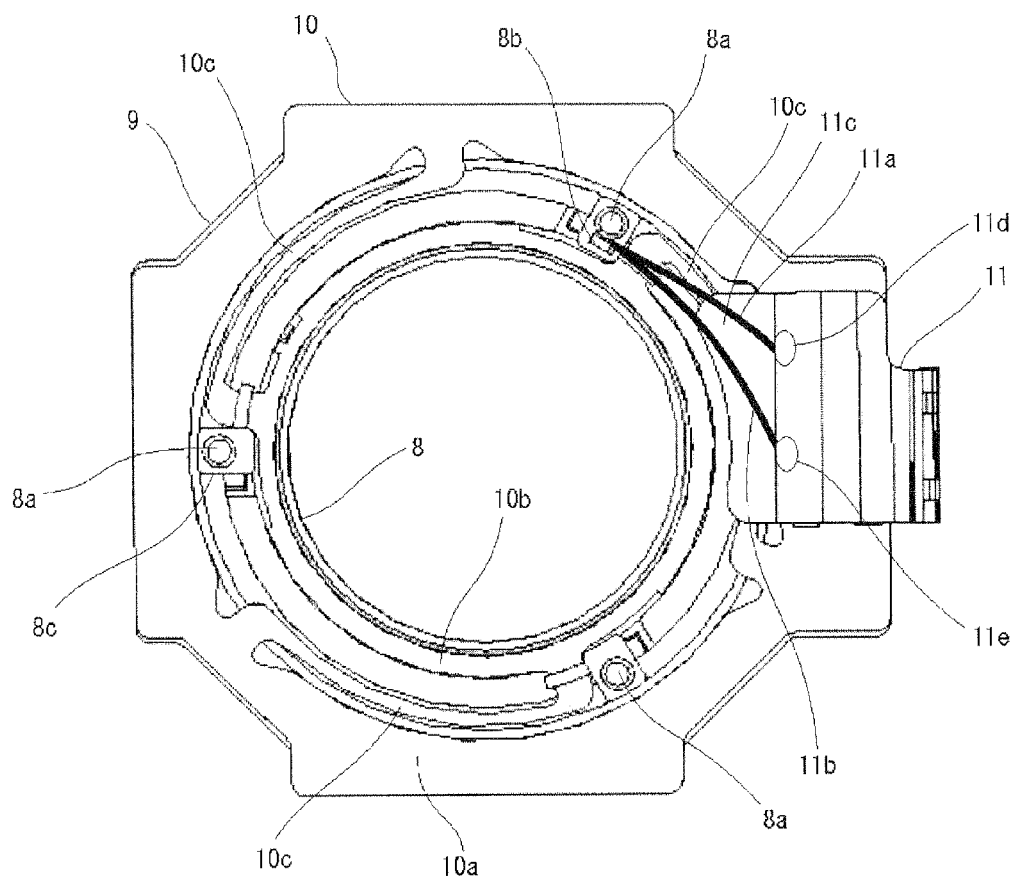
FIG. 2 is a plan view which shows a holder 8, a lower leaf spring 10, lead wires 11a, 11b and a flexible printed circuit board 11 of the actuator assembly 1 of the camera module shown in FIG. 1 (viewed from the bottom side of the holder 8).
Figure 3:
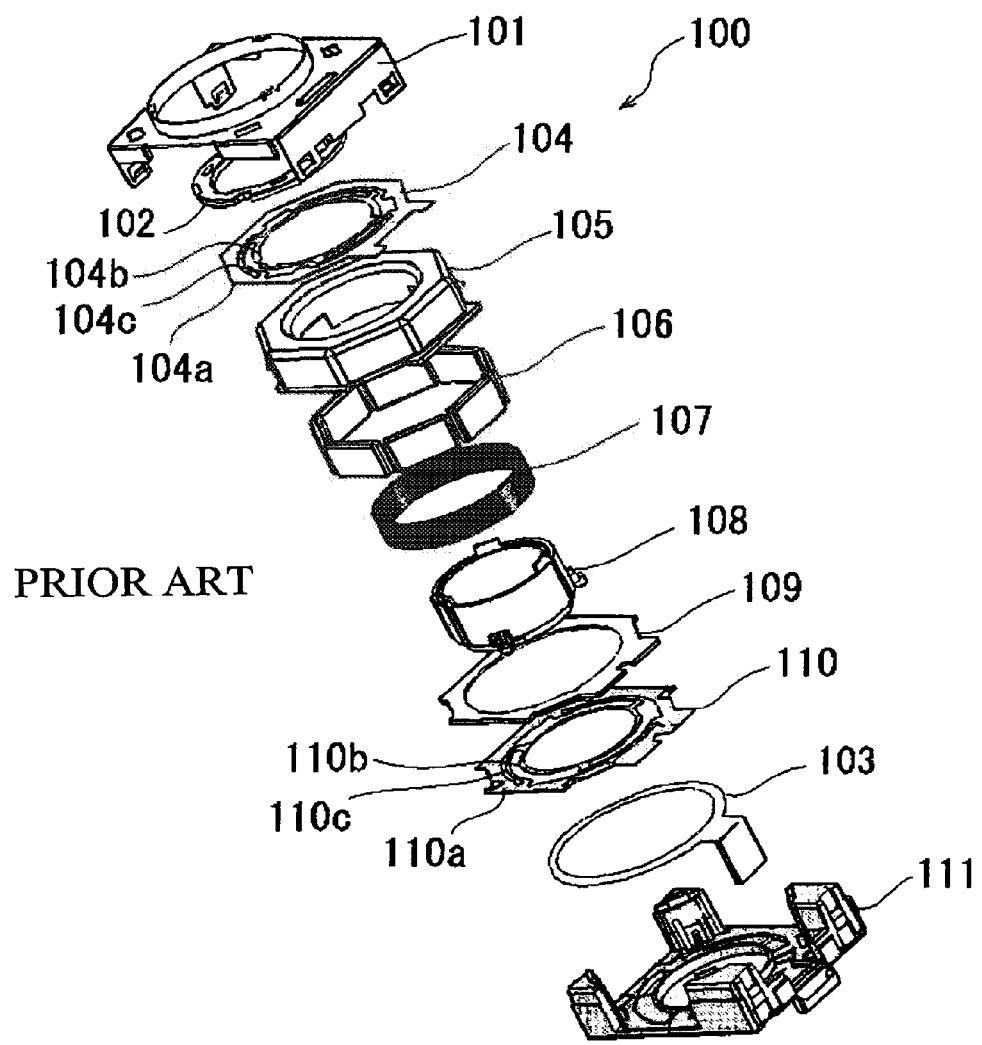
FIG. 3 is an exploded perspective view of an actuator assembly 100 of a conventional camera module.
Figure 4:
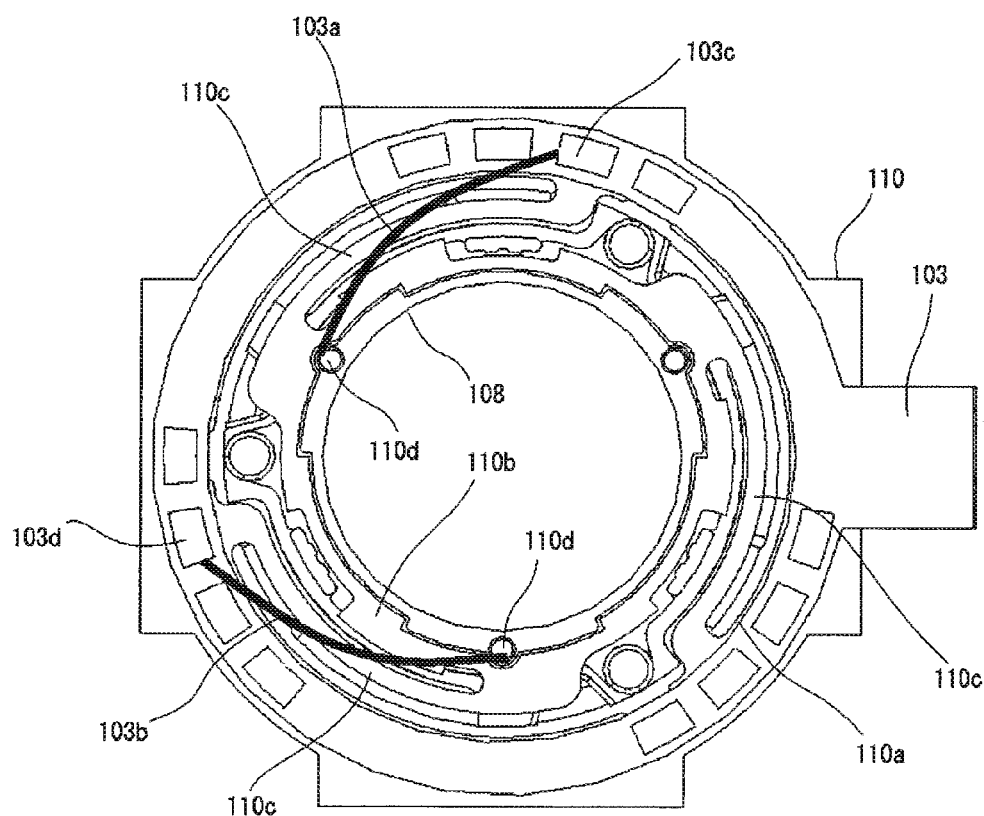
FIG. 4 is a plan view which shows a holder 108, a lower leaf spring 110, lead wires 103a, 103b and a flexible printed circuit board 103 of the actuator assembly 100 of the camera module shown in FIG. 3 (viewed from the bottom side of the holder 108).

As described above, the flexible printed circuit board 11 which supplies an electrical current to the coil 7 is provided below the outer annular portion 10a of the outer leaf spring 10. As shown in FIG. 2, the two lead wires 11a, 11b which are both end portions of the wire of the coil 7 are connected to pads 11d, 11e of the flexible printed circuit board 11, respectively. Note that the lead wire 11a is a lead wire for a positive side of the coil and the lead wire 11b is a lead wire for a negative side of the coil.

These lead wires 11a, 11b are extended from the coil 7 through an aperture 8b formed in the coil support portion 8c, and arranged below the bridge portions 10c so as to extend through a predetermined space between the bottom surfaces of the bridge portions 10c and the lead wires 11a, 11b. Tip ends of the lead wires 11a, 11b are connected to the pads 11d, 11e of the flexible printed circuit board 11. In this regard, please note that the outer annular portion 10a of the lower spring 10 is attached to the yoke 5 through the annular plate 9, and the yoke 5 is electrically connected to a cover of a substrate (not shown) on which the camera module is mounted to thereby provide a ground therebetween.

The flexible printed circuit board 11 is formed from a flexible printed circuit board having an insulating sheet portion and a pattern portion, and formed into a roughly L-shape. Such a flexible printed circuit board 11 is arranged below the lower leaf spring 10. The flexible printed circuit board 11 is electrically connected to the substrate on which the camera module is mounted so that an electrical current is supplied from the substrate to the coil 7 through the lead wires 11a, 11b.

A part of the insulating sheet portion of the flexible printed circuit board 11 is formed into a tongue part 11c which extends in a tongue-shaped manner. The tongue part 11c is arranged in a space between the bridge portion 10c and the lead wires 11a, 11b so that the bridge portion 10c does not make contact with the lead wires 11a, 11b even in the event that the bridge portion is largely deformed. Namely, as shown in FIG. 2, the tongue part 11c is provided so as to extend below the bridge portion 10c which is positioned in a region where the lead wires 11a, 11b are arranged. In other words, the tongue part 11c is provided so as to cover most of the lead wires 11a, 11b. In this regard, it is to be noted that a space is created between the bottom surface of the bridge portion 10c and the top surface of the tongue part 11c due to the back tension applied to the upper and lower leaf springs 4 and 10 as described above. Further, the lead wires 11a, 11b extend in a space below the tongue part 11c with a predetermined space being left with respect to the bottom surface of the tongue part 11c. The space between the bridge portion 10c and the tongue part 11c and the space between the bottom surface of the tongue part 11c and the lead wires 10a, 10b are respectively set so that the bridge portion 10c does not make contact with the tongue part 11c and the tongue part 11c does not make contact with the lead wires 11a, 11b when the holder 8 is displaced by supplying an electrical current to the coil 7. Further, in the event that the holder 8 is largely displaced and thus the bridge portion 10c is deformed due to shock applied to the camera module. However, in such a case, since the tongue part 11c is arranged below the bridge portion 10c, it is possible to prevent the deformed bridge portion 10c from making direct contact with the lead wires 11a, 11b. Therefore, it is possible to prevent the insulating coating of the lead wires 11a, 11b from being damaged by the deformed bridge portion 10c.

According to the camera module having the above structure, an application of the silicone resin to the bridge portions 10c that was carried out in the manufacturing process of the conventional camera module becomes unnecessary, thereby leading to a reduced manufacturing cost of the camera module. Further, a process for applying the silicone resin onto the bottom surfaces of the bridge portions of the lower leaf spring can be omitted, a time required for manufacturing the camera module can be shortened.

Further, as shown in FIG. 2, the tongue part 11c extends only in a region where the lead wires 11a, 11b are arranged. This makes it possible to design the tongue part 11 so as to have a minimum area necessary for preventing direct contact between the deformed bridge portion 10c and the lead wires 11a, 11b. This reduced area of the tongue part 11c makes it possible to further reduce manufacturing cost of the camera module.

Although the above embodiment is directed to the case where the bridge portion 10c of the lower leaf spring 10 is insulated from the lead wires 11a, 11b by means of the tongue part 11c, the present invention is not limited thereto. The present invention may be applied to the case where lead wires are arranged near the bridge portion 4c of the upper leaf spring 4. Further, the shape and size of the tongue part 11c described above is mere one example, and thus it goes without saying that the shape and size of the tongue part 11c may be changed appropriately according to the structure of a camera module and the shape of a bridge portion thereof.

Further, it is also to be understood that the present disclosure relates to subject matter contained in Japanese Patent Application No. 2006-249708 (filed on Sep. 14, 2006) which is expressly incorporated herein by reference in its entirety.

What is claimed is:

1. A camera module, comprising:
    a lens unit which constitutes an optical system of the camera module;
    a holder which houses the lens unit and is displaceable along an optical axis direction of the lens unit, the holder having a cylindrical shape having upper and lower cylindrical end portions;
    a coil provided on the holder, the coil being formed from a wound wire having both end portions used as lead wires for supplying an electrical current to the coil;
    a yoke and magnets provided on the yoke for providing a magnetic field to the coil;
    a flexible printed circuit board to which the lead wires are connected for supplying an electrical current to the lead wires, the flexible printed circuit board having an insulating sheet portion and a pattern portion;
    upper and lower leaf springs for supporting the holder so that the holder is displaceable along an optical axis direction of the lens unit, each of the upper and lower springs including an outer annular portion, an inner annular portion provided inside the outer annular portion and attached to one of the cylindrical end portions of the holder, and a plurality of bridge portions coupled between the outer annular portion and the inner annular portion for displaceably supporting the inner annular portion with respect to the outer annular portion; and
    an imaging element provided below the lens unit,
    wherein a part of the insulating sheet portion of the flexible printed circuit board is formed into a tongue part which extends in a tongue-shaped manner, wherein the tongue part is arranged in a space between one of the bridge portions of the upper or lower leaf spring and the lead wires so that the bridge portion does not make contact with the lead wires even in the event that the bridge portion is hardly deformed.

2. The camera module as claimed in claim 1, wherein the flexible printed circuit board is arranged below the lower leaf spring so that the tongue part extends substantially along with a predetermined bridge portion of the lower leaf spring.

3. The camera module as claimed in claim 2, wherein the tongue part is formed so as to cover most of the lead wires.

* * * * *